Jan. 20, 1959 R. N. ECK ET AL 2,870,392
ELECTRIC CONTROLLERS FOR MACHINES
Filed May 13, 1955 2 Sheets-Sheet 1
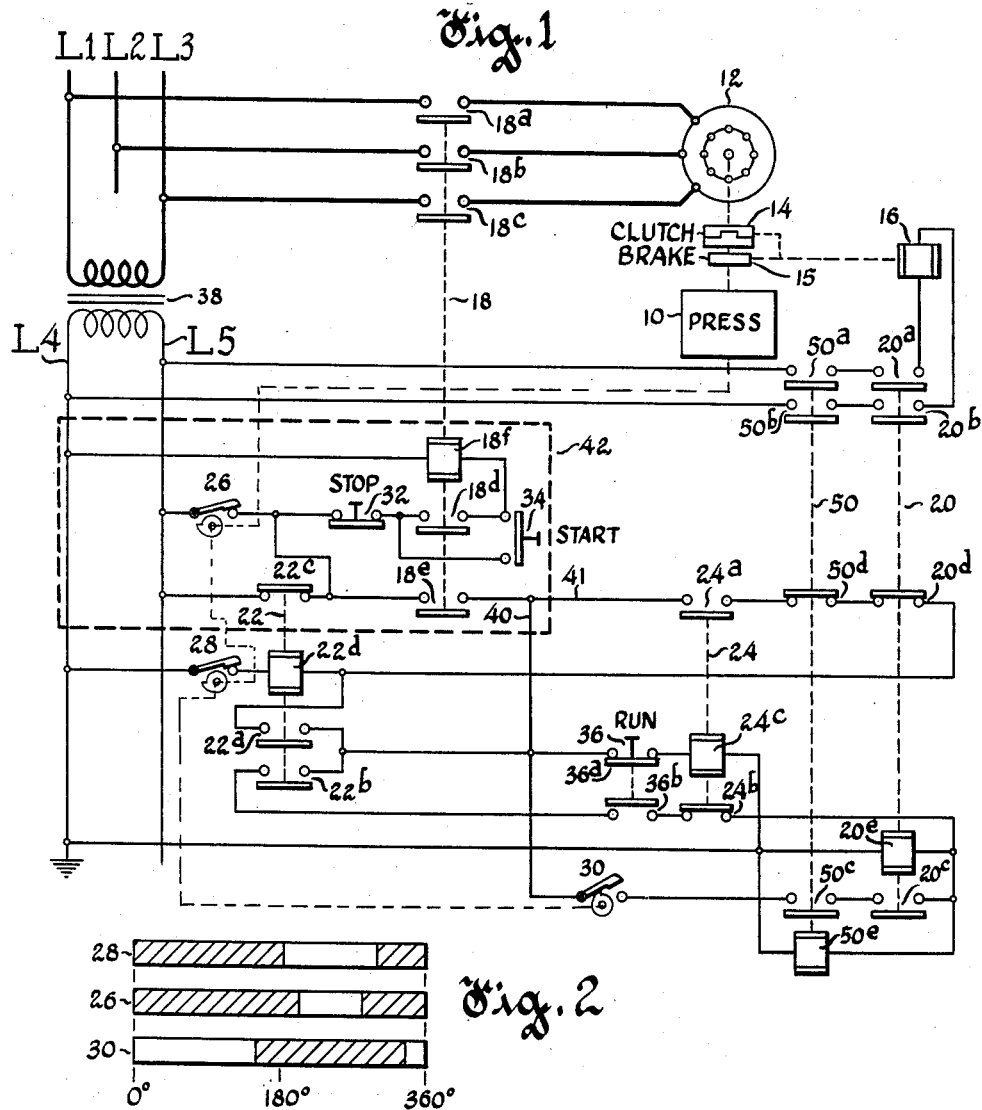
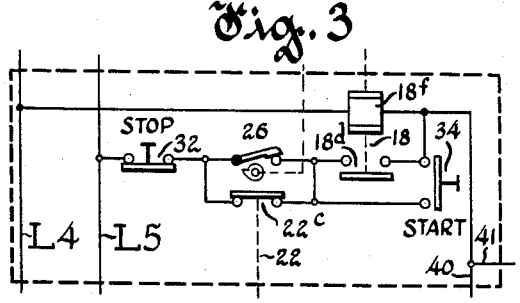
Inventors.
Robert N. Eck.
Verne H. Simson.
By Grover G. Foster
Attorney.

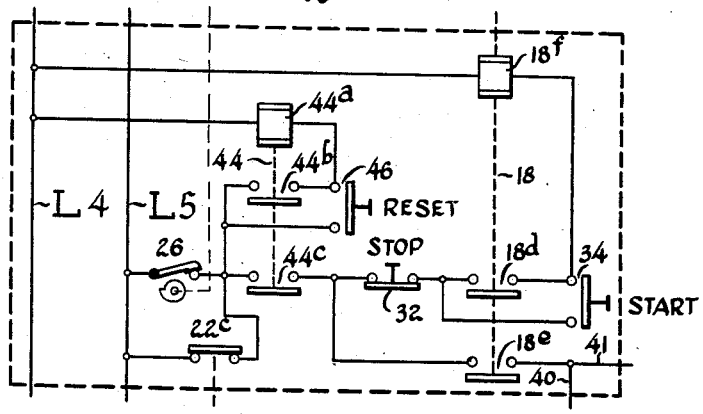
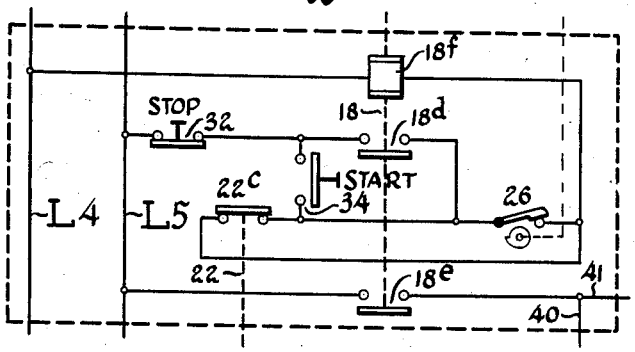
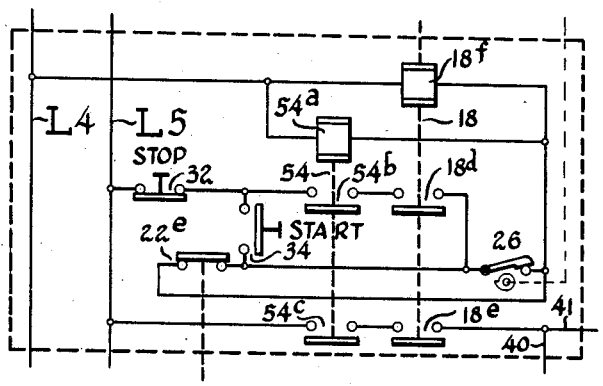

United States Patent Office 2,870,392
Patented Jan. 20, 1959

2,870,392

ELECTRIC CONTROLLERS FOR MACHINES

Robert N. Eck, Whitefish Bay, and Verne H. Simson, Milwaukee, Wis., assignors to Cutler-Hammer, Inc., Milwaukee, Wis., a corporation of Delaware Application May 13, 1955, Serial No. 508,056

6 Claims. (Cl. 318—470)

This invention relates to improvements in electric controllers for machines.

An object of the invention is to provide an electric controller of the character described in which is incorporated improved safety means.

A more specific object is to provide a controller for effecting "non-repeat" or "single-cycle" operation of a machine and which will "fail-safe" so that a failure of those components which result in "non-repeat" operation cannot result in continuous or repeat operation or malfunctioning of the machine.

Other objects and advantages of the invention will hereinafter appear.

The accompanying drawing illustrates certain embodiments of the invention, it being understood that various modifications may be made in the embodiments illustrated and that other embodiments are possible to be made without departing from the spirit of the invention and the scope of the appended claims.

In the drawing,

Figure 1 is a diagrammatic showing of an electric controller embodying the invention;

Fig. 2 is a chart illustrating the operation of the controller of Fig. 1; and

Figs. 3 through 6 illustrate diagrammatically certain modifications of the controller of Fig. 1.

Referring to Fig. 1 of the drawing, there is shown a mechanical press, or other machine having a cyclically driven element, 10 which is driven by a three phase electric motor 12 through the medium of a clutch 14 when a solenoid 16 is energized. Power for the motor 12 is supplied from a suitable three phase alternating power source such as lines L1, L2 and L3.

The function of the remainder of the system is to control energization of motor 12 and solenoid 16. Only so much of the control system is illustrated as is necessary to "single-cycle" or "non-repeat" operation of the machine or press 10. In this mode of operation it is intended that the motor 12 run continuously and that each cycle of press operation will require operation and subsequent release of a pushbutton before another cycle of machine or press operation can begin.

The control circuit comprises: a main electro-magnetic contactor 18 having normally open contacts 18$^a$, 18$^b$, 18$^c$, 18$^d$ and 18$^e$ and an energizing coil 18$^f$; a control contactor 20 having normally open contacts 20$^a$, 20$^b$ and 20$^c$, normally closed contact 20$^d$ and an operating coil 20$^e$; a first "non-repeat" contactor 22 having normally open contacts 22$^a$ and 22$^b$, normally closed contact 22$^c$ and an energizing coil 22$^d$; a second "non-repeat" contactor 24 having normally open contact 24$^a$, normally closed contact 24$^b$, and an energizing coil 24$^c$; cam operated limit switches 26, 28 and 30 which are operative at selected positions of the movable element of the machine 10; a normally closed Stop switch 32, a normally open Start switch 34; and a Run button 36 having normally closed contact 36$^a$ and normally open contact 36$^b$.

A contactor 50 has normally open contacts 50$^a$, 50$^b$ and 50$^c$ and normally closed contact 50$^d$ corresponding to and in series circuit with contacts 20$^a$, 20$^b$, 20$^c$, and 20$^d$, respectively, of contactor 20. Contactor 50 has an operating coil 50$^e$ in parallel with coil 20$^e$. The operation of contactors 20 and 50 is identical and for the sake of simplicity the control circuit will be described as though contactor 50 was not present. Power for the control circuit is supplied by lines L4 and L5 from lines L1 and L3 through an isolating transformer 38.

When more than one operator is required to operate the press, additional pushbuttons are provided. And, just as contactors 20 and 50 perform the same function and are "doubled-up," it is common to "double-up" other contactors and the limit switches of the circuit. The limit switches 26, 28 and 30 may be mechanically connected to the machine directly or indirectly and may be mechanically or electrically operated.

Fig. 2 illustrates the operation of limit switches 26, 28 and 30. The darkened areas indicate a closed limit switch contact and the undarkened areas indicate an open limit switch contact. The left and right-hand sides of Fig. 2, marked zero degrees and 360 degrees respectively, indicate the upper extreme position of the ram of press 10. The 180 degree position of Fig. 2 indicates the lower extreme position of the ram of press 10.

The press is provided with brake means 15 to insure that it will stop in its upper or zero position. In this position limit switch 26 is closed. Upon closure of Start switch 34 a circuit is completed from line L5 through limit switch 26, Stop switch 32, Start switch 34 and energizing coil 18$^f$ of contactor 18 to line L4. Upon energization of coil 18$^f$, contacts 18$^a$, 18$^b$ and 18$^c$ are closed to energize and effect operation of motor 12. Contact 18$^d$ closes to complete a maintaining circuit for coil 18$^f$. Contact 18$^e$ is closed to complete a circuit from line L5 through limit switch 26 and contact 18$^e$ to conductors 40 and 41.

The energizing coil 24$^c$ of contactor 24 is then energized through a circuit which may be traced from conductor 40 through normally closed contact 36$^a$ of Run button 36 and coil 24$^c$ to line L4. Contactor 24 picks up to open its contact 24$^b$ and to close its contact 24$^a$. Closure of the latter completes a circuit from conductor 40 through contact 24$^a$, contact 20$^d$, energizing coil 22$^d$ and limit switch 28 to line L4. Energization of coil 22$^d$ results in the opening of contact 22$^c$ and closure of contacts 22$^a$ and 22$^b$. Closure of contact 22$^a$ completes a maintaining circuit for coil 22$^d$ around contact 24$^a$ and contact 20$^d$. Closure of contact 22$^b$ completes a circuit from conductor 40 through contact 22$^b$ to one terminal of normally open contacts 36$^b$ of Run button 36.

To effect energization of solenoid 16 to release brake 15 and connect press 10 to motor 12 through clutch 14, the press operator must depress the Run button 36 to open contact 36$^a$ and close contact 36$^b$. By this action coil 24$^c$ is de-energized and contact 24$^a$ is opened. Coil 22$^d$ remains energized by virtue of the maintaining connection to its contact 22$^a$.

Contact 22$^b$ remains closed and current flows from conductor 40 through contact 22$^b$, through the now closed contact 36$^b$ of Run button 36 and the now closed contact 24$^b$ of contactor 24, through energizing winding 20$^e$ of relay 20 to line L4. Contactor 20 is actuated to close contacts 20$^a$ and 20$^b$ and complete the circuit from line L5 through solenoid 16 to line L4. The clutch 14 interconnects press 10 and motor 12 and the press begins to move. At the same time contact 20$^d$ in the normal energizing circuit of coil 22$^d$, opens and contact 20$^c$ closes.

After the press parts have moved to a position in which the operator cannot get hurt, limit switch 30 closes to complete a maintaining circuit for coil 20$^e$ from conductor 40, through limit switch 30, through the now closed contact 20$^c$ and coil 20$^e$ to line L4. The operator may, and normally does, release the Run button 36 at this time. Upon release of the Run button contact 36$^a$ is closed and coil 24$^c$ is re-energized to close its contact 24$^a$ preparatory to re-establishment of the main energizing circuit for coil 22$^d$.

Contact 24$^b$ opens. A short time later in the cycle of press operation, limit switch 28 opens to de-energize coil 22$^d$. Contact 22$^a$ is opened to open the maintaining circuit for coil 22$^d$. Contact 22$^b$ is opened to open the main energizing circuit for coil 20$^e$. Contact 22$^c$ closes to re-establish the maintaining circuit for coil 18$^f$ of main contactor 18 around limit switch 26 which opens a short time later.

Somewhat later in the cycle of press operation limit switch 26 recloses. A short time later limit switch 28 closes. Coil 22$^d$ is not energized because its maintaining contact 22$^a$ is open and its main energizing circuit is open at contact 20$^d$. Near the end of the cycle of press operation limit switch 30 opens to interrupt the maintaining circuit for coil 20$^e$ and this coil drops out to open contacts 20$^c$, 20$^a$ and 20$^b$ and to deenergize solenoid 16 and disconnect press 10 from motor 12. Contact 20$^d$ closes to re-energize coil 22$^d$. Braking means 15, operated by solenoid 16, stops press 10 at the upper end of its stroke in the zero degree position. The control circuit has now been returned to its original condition following closure of Start switch 34. A new cycle of press operation may be initiated by operation of Run button 36.

The operator cannot cause the press to run continually by keeping the Run button depressed throughout the entire operating cycle of the press. If he attempts to do so, contact 24$^a$ will remain open. After relay 22 is de-energized by the opening of limit switch 28 and after contact 22$^b$ opens, an energizing circuit cannot be established to coil 20$^e$ even though contacts 36$^b$ and 24$^b$ are both closed.

The control circuit checks itself on each stroke of the press. If a failure should occur the circuit will "fail safe" and prevent commencement of the next press stroke.

Upon failure of supply power, contactor 18 drops out and motor and press both stop. The Start button must be operated to restart the motor.

If relay 22 fails to pick up, contactors 20 (and 50) and 24 cannot be energized. If contactor 22 fails to drop out, power is disconnected from the motor and the control circuit when limit switch 26 opens and the motor and press stop. These results are obtained even if the operator fails to release the Run button during a press stroke.

If contactor 24 fails to pick up, contactor 22 cannot be energized and the press will stop at the end of its stroke. If contactor 24 fails to drop out, contactor 20 (and 50) cannot be energized and a new cycle of press operation cannot be started.

If a "dummy" plug is inserted in the Run button station, contactor 24 will continue to be energized so that contactor 20 (and 50) cannot be energized and a new cycle of press operation cannot be started.

It is obvious that if both of contactors 20 and 50 fail to drop out, the solenoid 16 will be energized directly across lines L4 and L5 and the press will run continuously. Therein lies the reason for using two contactors to energize the solenoid. Both of these contactors would have to stick closed on the same stroke of the press for such a failure to occur and this is extremely unlikely.

If either contactor 20 or 50 fails to pick up, the solenoid 16 cannot be energized and the press cannot be started. If either contactor 20 or contactor 50 fails to drop out, the other contactor will open the solenoid circuit and stop the press. The contactor which is stuck will have its normally closed contact 20$^d$ or 50$^d$ open. The energizing circuit to coil 22$^d$ will be open. Therefore, contact 22$^d$ will be opened and it will be impossible to reenergize coil 20$^e$ or 50$^e$ even though the Run button is operated properly.

If both contactor 22 and 20 (or 50) fail to drop out during the same cycle of press operation and whether the operator removes or fails to remove his hands from the Run button during the press cycle, the limit switch 26 opens to de-energize both the motor and the press control circuit.

Fig. 3, which is enclosed in dotted lines and which illustrates a modification of that portion 42 of Fig. 1 which is enclosed in dotted lines, shows that contact 18$^e$ of contactor 18 may be dispensed with. Conductor 40 is connected to a circuit point intermediate contact 18$^d$ and coil 18$^f$. Conductor 40 will be energized when contact 18$^d$ or Start switch 34 is closed.

If in Fig. 1, or Fig. 3, the contactor 18 is very large and is slow in its operation, it is possible that its contacts would not be actuated in a sufficiently short time to prevent commencement of a press cycle if contactor 22 failed. This possibility is overcome by modification of that portion 42 of Fig. 1, which is enclosed in dotted lines as illustrated in Fig. 4. This circuit is identical to that shown in Fig. 1, except for the addition of a normally open reset contact 46 and a contactor 44 having an energizing coil 44$^a$ and normally open contacts 44$^b$ and 44$^c$. Contact 44$^c$ is connected in series circuit with interlock switch 26 and contact 22$^c$ between line L5 and the connection between Stop button 32 and contact 18$^e$.

Coils 18$^f$ and 44$^a$ of contactor 18 and contactor 44, respectively, are energized in parallel. Each of these devices has a normally open contact in the series circuit from line L5 through limit switch 26 to conductor 40.

Contactor 44 may be a switch of small physical size whose speed of operation is sufficient to accomplish the desired protective features. This choice is not always possible to be made for contactor 18, since this contactor must be of size suitable to control the main motor power circuit.

In Fig. 5 is illustrated another alternative circuit for substitution into the portion 42 of Fig. 1 which is enclosed in the dotted line. Relay 18 is energized, when Start switch 34 is closed, from line L5 through Stop switch 32 and Start switch 34, and thence through either of limit switch 26 or contacts 22$^c$ of contactor 22, and finally through coil 18$^f$ to line L4. When coil 18$^f$ is energized, contact 18$^d$ closes to establish a maintaining circuit around Start switch 34 and contact 18$^e$ closes to connect line L5 to conductor 40.

The modification illustrated in Fig. 6 differs from that shown in Fig. 5 only in that another contactor 54 has been added. The coil 54$^a$ of this contactor is connected in parallel with coil 18$^f$ of contactor 18. The normally open contact 54$^b$ of the contactor is connected in series with contact 18$^d$ across Start button 34. Another normally open contact 54$^c$ is connected in series with contact 18$^e$. Thus contactor 54 acts like contactor 18 in respect of the control circuit but being smaller, it acts faster.

Each of these modified circuits operates as does the circuit of Fig. 1 in that if contactor 22 fails to pick up, contactors 20 (and 50) and 24 cannot be energized and the press stops. If contactor 22 fails to drop out the motor and press will stop when limit switch 26 opens.

When limit switch 26 is open and contact 22$^c$ is open, the entire control circuit comprising contactors 22, 24, 20 and 50 will be de-energized. This feature provides a large measure of safety protection. However, if the operator continues to hold the Run button down, and if the "non-repeat" contactor 22 is stuck closed, then even though limit switch contact 26 opens to de-energize the circuit, the press may actually not stop until limit switch contact 26 has reclosed. The control circuit would then be re-energized and it is possible that the press would run continuously except for a momentary hesitation at the time limit switch 26 opened.

Contact 18e is included in the circuit and is so connected to insure that the circuit will remain de-energized even though the press moves to a point where limit switch contact 26 recloses. The operator must press the Start button 34 before the next press stroke can be initiated. Even if contactor 22 remains stuck the press operator and the press will be protected.

We claim:

1. For controlling the energization of an electric driving motor and its mechanical connection to a machine having a movable element, a controller comprising electromagnetic means energizable to complete driving connections between the motor and the movable element of the machine, an electromagnetic contactor energizable to complete energizing connections to the motor, means for completing an energizing circuit for said contactor and including a first switch operable in certain positions of the movable element of the machine to interrupt said energizing circuit, an electromagnetic relay, means responsive to energization of said contactor to complete an energizing circuit for said relay and including a second switch operable in given positions of the movable element of the machine to interrupt the last mentioned energizing circuit, means for completing an energizing circuit for said electromagnetic means whenever said contactor and said relay are both energized, and means responsive to deenergization and drop-out of said relay to maintain the energizing circuit for said contactor regardless of interrupting action of said first switch.

2. The controller in accordance with claim 1 wherein the last mentioned means comprises normally closed contacts carried by said relay connected in parallel with said first mentioned switch in the energizing circuit for said contactor.

3. The controller in accordance with claim 2 wherein said means for completing an energizing circuit for said contactor comprises a manually operable switch connected in series with the energizing coil of said contactor and said first switch and normally open contacts carried by said contactor connected in shunt with said manually operable switch.

4. The controller in accordance with claim 3 wherein said means responsive to energization of said contactor to complete an energizing circuit for said relay comprises a second relay, second normally open contacts carried by said contactor connected in series with the energizing coil of said second relay, and normally open contacts carried by said second relay connected in series with said second switch and the operating coil of the first mentioned relay.

5. The controller in accordance with claim 4 wherein said means for completing an energizing circuit for said electromagnetic means comprises a third relay having normally open contacts which close upon energization of said third relay to complete the energizing circuit for said electromagnetic means, a manually operable switch having normally closed contacts in series with the energizing coil of said second relay and normally open contacts connected in series with normally open contacts carried by the first mentioned relay and normally closed contacts carried by said second relay in the energizing circuit for said third relay.

6. In combination, a machine having a movable element, an electric motor, means including electromagnetic means energizable to complete driving connections between said movable element and said motor, an electromagnetic contactor energizable to complete energizing connections to said motor, means for completing an energizing circuit for said contactor and including a first switch operable in certain positions of said movable element to interrupt said energizing circuit, an electromagnetic relay, means responsive to energization of said contactor to complete an energizing circuit for said relay and including a second switch operable in given positions of said movable element to interrupt the last mentioned energizing circuit, means for completing an energizing circuit for said electromagnetic means whenever said contactor and said relay are both energized, and means responsive to deenergization and drop-out of said relay to maintain the energizing circuit for said contactor regardless of the interrupting action of said first switch.

References Cited in the file of this patent

UNITED STATES PATENTS

| 2,479,920 | Gambrill | Aug. 23, 1949 |
| 2,583,662 | Noble | Jan. 29, 1952 |